United States Patent [19]

Hosoda et al.

[11] 4,135,370
[45] Jan. 23, 1979

[54] HUMIDITY CONTROL APPARATUS

[75] Inventors: Taisei Hosoda; Hideo Uzuhashi; Nobuyuki Kobayashi; Masaaki Tanaka, all of Tochigi, Japan

[73] Assignee: Hitachi, Ltd., Japan

[21] Appl. No.: 803,386

[22] Filed: Jun. 3, 1977

[30] Foreign Application Priority Data

Nov. 4, 1976 [JP] Japan .................................. 51-131725

[51] Int. Cl.² .................. F25D 23/06; F28D 5/00; F25D 17/06
[52] U.S. Cl. ........................................... 62/274; 62/92; 62/314
[58] Field of Search .................... 62/91, 92, 274, 291, 62/314

[56] References Cited

U.S. PATENT DOCUMENTS

| | | | |
|---|---|---|---|
| 2,133,039 | 10/1938 | Philipp | 62/91 |
| 2,654,232 | 10/1953 | Galazzi | 62/274 |
| 2,956,416 | 10/1960 | Taylor | 62/91 |
| 3,153,914 | 10/1964 | Meckler | 62/92 |
| 3,585,811 | 6/1971 | Friedel | 62/274 |
| 3,739,597 | 6/1973 | Schulze, Sr. | 62/314 |
| 3,740,959 | 6/1973 | Foss | 62/92 |
| 4,043,141 | 8/1977 | Levy et al. | 62/91 |

*Primary Examiner*—Lloyd L. King
*Attorney, Agent, or Firm*—Craig & Antonelli

[57] ABSTRACT

A humidity control apparatus characterized in that a dehumidifying mechanism, which comprises a refrigeration circuit composed of a compressor, a condenser, a decompression device, and an evaporator, a fan for drawing in air past the circuit, and a tank for collecting and storing the moisture in the condensed form, is combined with a humidifying mechanism comprising an intake duct into which part of the air current is by-passed, taking advantage of the dynamic pressure exerted by the fan, ultrasonic humidifying-vapor generator means wherein the air from the intake duct is mixed with water vapor, and a discharge duct through which the air-vapor mixture is discharged to the outside, said generator means being supplied with water from said tank. The tank has tapped holes at its top and bottom so that, for dehumidification, it serves as a water storage tank with the upper hole kept open and the lower hole closed with a solid plug and, for humidification, it serves as a feed water tank with the upper hole closed by the plug and the lower hole connected with feeder means for water supply to the vapor generator means.

6 Claims, 3 Drawing Figures

FIG. 1
FIG. 2
FIG. 3
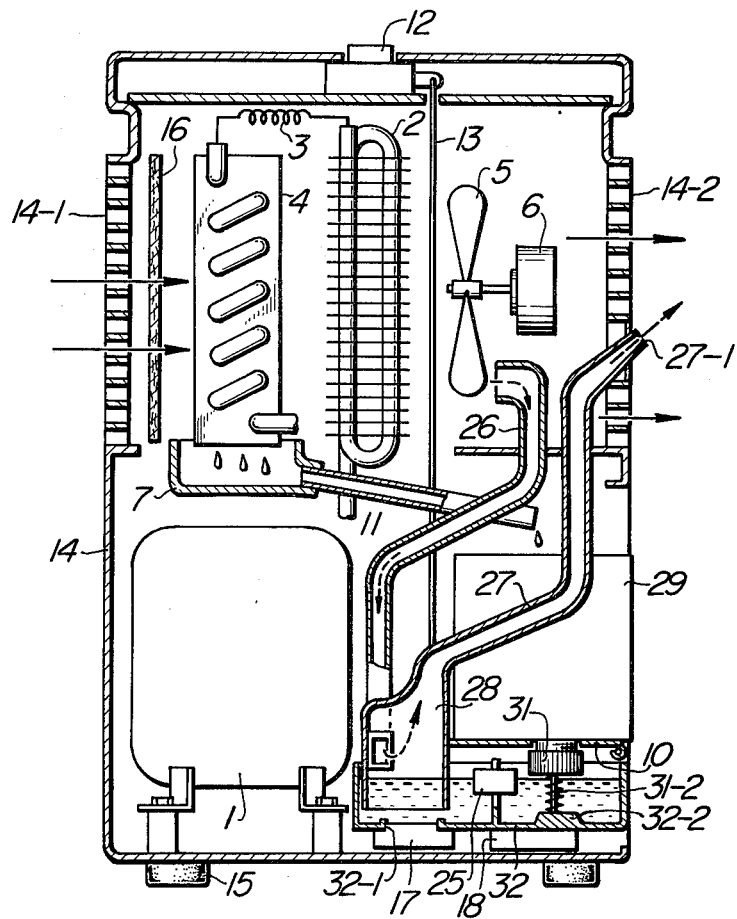
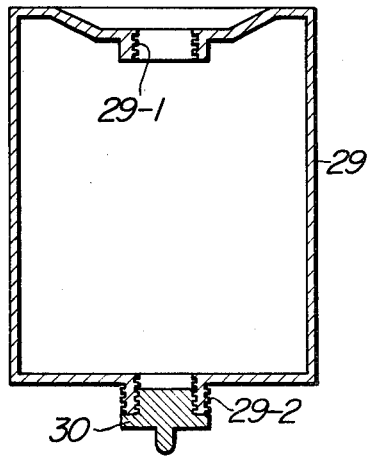
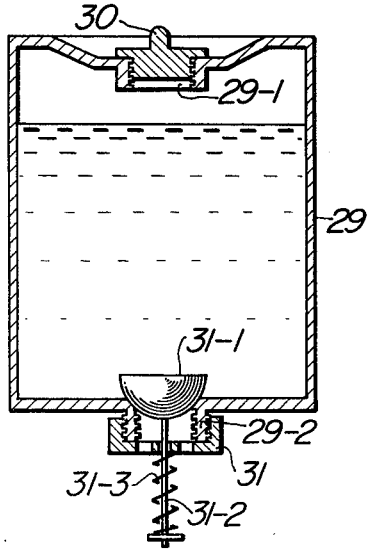

HUMIDITY CONTROL APPARATUS

BACKGROUND OF THE INVENTION

This invention relates to a humidity control apparatus for air conditioning which performs both humidifying and dehumidifying functions.

For year-round control of humidity in a given space it has been common to use two separate units, i.e., a dehumidifier in the humid season and a humidifier in the dry season. Such single-purpose units for alternate services call for extra locations, in addition for installation, for storage when out of use, adding to the cost accordingly.

The present invention is directed to the elimination of those disadvantages and to the provision of a humidity control apparatus which combines the two functions in a single, self-contained unit of a compact construction.

According to the invention, a humidity control apparatus is provided which is characterized in that a dehumidifying mechanism, comprising a refrigeration circuit composed of a compressor, a condenser, a decompression device, and an evaporator, a fan for drawing in air past the circuit, and a tank for collecting and storing the moisture in the condensed form, is combined with a humidifying mechanism comprising an intake duct into which part of the air current is bypassed, taking advantage of the dynamic pressure exerted by the fan, ultrasonic humidifying-vapor generator means wherein the air from the intake duct is mixed with water vapor, and a discharge duct through which the air-vapor mixture is discharged to the outside, said generator means being supplied with water from said tank.

Also, according to the invention, a humidity control apparatus as set forth above is provided which is further characterized in that said tank has tapped holes to be plugged at its top and bottom, in such a manner that, for dehumidification, it serves as a water storage tank with the upper tapped hole kept open and the lower tapped hole closed with a solid plug and, for humidification, it serves as a feed water tank with the upper hole closed by the plug and the lower hole connected with feeder means for water supply to the vapor generator means.

BRIEF DESCRIPTION OF THE DRAWINGS

FIG. 1 is a vertical sectional view of a humidity control apparatus embodying the invention;

FIG. 2 is a vertical sectional view, on an enlarged scale, of the tank of the apparatus in use for dehumidification; and FIG. 3 is a view similar to FIG. 2, showing the tank in use for humidification.

DESCRIPTION OF THE PREFERRED EMBODIMENT

Referring to the drawings, and specifically to FIG. 1 which shows an embodiment of the invention, 1 is a compressor for changing a gaseous refrigerant at a low temperature and a low pressure to a high-temperature, high-pressure one, 2 is a condenser for changing the high-temperature, high-pressure gaseous refrigerant to a medium-temperature, high-pressure liquid one, 3 is a decompression device for changing the medium-temperature, high-pressure liquid refrigerant to a low-temperature, low-pressure one, and 4 is an evaporator for changing the low-temperature, low-pressure refrigerant to a low-temperature, low-pressure one and thereby lowering the surface temperature of the evaporator 4 itself. Thus, a refrigerant circuit is formed by connecting the compressor 1, condenser 2, decompression device 3, evaporator 4, and again the compressor, in the order mentioned, by piping (not shown). There are also shown a fan 5, a motor 6 for driving the fan, and a drip pan 7 provided immediately below the evaporator 4. 10 is a tank support plate and 11 is a drain hose connected to the drip pan 7. A control switch 12 is connected to the tank support plate 10 by a connecting lever 13. The case or cabinet 14 includes an intake grille 14-1 and an outlet grille 14-2, and has pads 15 at its bottom. Between the evaporator 4 and the intake grille 14-1 is held an air filter 16 which is readily detachable. An ultrasonic oscillator 17 is associated with a controller 18 for actuating the oscillator. Adjacent to the oscillator are shown a float switch 25 and an intake duct 26 open to the discharge side of the fan 5 so that part of the air current is taken into the duct by the dynamic pressure. A discharge duct 27 is open to the atmosphere at its outlet 27-1. A water vapor chamber 28 is connected between the intake duct 26 and the discharge duct 27.

A tank 29 is designed to serve two purposes of water storage and supply. As better shown in FIGS. 2 and 3, the tank 29 has a tapped hole 29-1 at its top and a tapped hole 29-2 at its bottom, both with a rim extended downwardly. Either of them is adapted to engage an externally threaded solid plug 30. A perforated cap 31, designed for thread engagement of the externally threaded rim of the hole 29-2, carries a valve 31-1 with a needle 31-2 and a spring 31-3.

Turning to FIG. 1, a water changer 32 has an opening 32-1 at its bottom through which the ultrasonic oscillator 17 is installed. The needle 31-2 is supported in position by a needle rest 32-2.

The operation of the humidity control apparatus, constructed as above, will now be explained.

For dehumidifying operation, the upper tapped hole 29-1 of the tank 29 is kept open and the lower tapped hole 29-2 is closed by the solid plug 30. The tank 29 is placed empty on the tank support plate 10 within the cabinet 14, and the compressor 1 and the motor 6 are started. Humid air is drawn in and flown through the unit in the direction of full-line arrows. The air current passes through the intake grille 14-1 and the filter 16. Stripped of dust, the clean air is cooled by the low-temperature surface of the evaporator 4. The moisture content, cooled to a temperature below the saturation point, condenses on the evaporator surface. The air thus dehumidified and cooled is reheated by the condenser 2 to a medium temperature with low humidity, and then is discharged through the discharge grille 14-2 so as to achieve the object of room drying.

In the meantime, the water drops formed by the condensation of moisture on the surface of the evaporator 4 are collected by gravity into the drip pan 7 and thence flown into the drain hose 11. The water falls through the tapped hole 29-1 into the tank 29 for storage. As the drain water continues to enter the tank 29, the water level inside rises gradually to approach the upper hole 29-1. Accordingly, the tank 29 must be manually emptied periodically so as to prevent the water accumulated in tank 29 from overflowing the tank and wetting the floor, carpet, or furniture. Therefore, to prevent undesirable spillage in the event of a failure to periodically empty the tank, the following overflow preventing control is provided. Before the hole is reached, the overall tank weight exceeds a predetermined value due to the added weight of the water accumulated in the tank 29 and, in response to this, the control switch 12 is turned on by the lever 13 linked to the tank support plate 10. The control switch brings the compressor 1 to a stop and prevents overflowing from the tank 29. Once the tank 29 has been emptied, its overall weight will again be below the above-noted predetermined value and operation of the dehumidifier can be restarted. While part of the air stream is subjected to the draft resistances of the intake duct 26 and discharge duct 27, the resistances are so little that the resulting loss of air blast is practically negligible. Hence the dehumidifying capacity of this apparatus is well comparable to that of the ordinary dehumidifiers designed for that purpose only.

For humidifying operation of the apparatus, the upper tapped hole 29-1 of the tank 29 is closed by the solid plug 30, water is introduced into the tank 29 through the lower tapped hole 29-2, and the perforated cap 31 is fitted, together with the valve 31-1, needle 31-2, and spring 31-3, on the lower hole 29-2. The tank is then placed on the tank support plate 10 in the same manner as for dehumidification. This causes the needle rest 32-2 to push the needle 31-2 upward to open the valve 31-1, allowing water to flow out of the tank 29 into the water chamber 32. When the water level in the chamber 32 has reached the underside of the cap 31, no more air is admitted to the tank 29 and also the water supply from the latter is discontinued, thus keeping the level constant. Then, the ultrasonic oscillator 17 is energized and water vapor is generated in the vapor chamber 28. At the same time, the motor 6 is started to drive the fan 5 and the dynamic pressure the fan creates forces part of the incoming air into the intake duct 26 and thence into the vapor chamber 28. The air thus carries the vapor through the discharge duct 27 and the discharge port 27-1 to the space to be humidified, as indicated by the broken-line arrows. In this way, the purpose of humidification is achieved.

The discharge duct 27 is inclined upwardly so that the water drops formed by condensation of the water vapor in the duct 27 are allowed to gather and flow downwardly back to the vapor chamber 28. Moreover, the discharge port 27-1 is protruding slightly outwardly of the cabinet 14 to prevent formation of water drops due to the recondensation inside the unit.

As the operation continues, the tank 29 feeds water from time to time by the valve action to the water chamber 32 so that the level in the latter may be kept unchanged. When the tank has completely emptied, the level in the chamber 32 drops and the float switch 25 is turned on to stop the oscillation of the ultrasonic oscillator 17 and thereby preclude damaging of the unit.

As described above, the humidity control apparatus of the invention takes advantage of the dynamic pressure exerted by the fan, that gives a draft for the refrigeration cycle, in causing part of the air current to bypass the main channel and flow through ducting into the humidifying arrangement including the ultrasonic oscillator so as to produce a mixed stream of air and water vapor. This eliminates the necessity of providing a separate fan for the humidifying arrangement. Moreover, because the tank serves dual purposes as a water storage tank during dehumidification and as a feed water tank during humidification, there is no need of employing a separate, additional tank for humidification. These features permit the apparatus of the invention to be built compactly at low cost.

What is claimed is:

1. A humidity control apparatus comprising a casing, a dehumidifier and a humidifier both arranged in said casing,
    said dehumidifier comprising a refrigeration circuit formed by a compressor, a condenser, a decompression device, an evaporator and again the compressor being connected in the order mentioned, a fan for passing air from the intake side of the casing to the outlet side of the casing through said evaporator and said condenser, and a tank for receiving and storing water condensate formed by the condensation of moisture on the surface of the evaporator;
    said humidifier comprising a water chamber arranged beneath said water tank, a ultrasonic oscillator arranged at the bottom of said water chamber for generating water vapor, a water vapor chamber arranged above said ultrasonic oscillator, an intake duct one end of which opens at the downstream side of said fan and the other end of which opens into said water vapor chamber for bypassing a part of the airstream generated by said fan into said water vapor chamber, an outlet duct one end of which is connected to said vapor chamber and the other end of which opens to the exterior of said casing for ejecting water vapor carried by said bypassed air stream therethrough, and means detachably mounted on the bottom of said tank for feeding water contained in said tank into said water chamber and for maintaining the water level in said water chamber constant when said apparatus is used as a humidifier and the same tank is used as a feed water tank.

2. A humidity control apparatus according to claim 1, further characterized in that said tank has tapped holes at its top and bottom, in such a manner as to enable it to serve as a water storage tank for dehumidification with the upper tapped hole kept open and the lower tapped hole closed with a solid plug and as to enable it to serve as a feed water tank for humidification with said upper hole closed by said plug and said lower hole connected with feeder means for supplying water to said vapor generator means.

3. A humidity control apparatus comprising:
    a housing,
    dehumidification means positioned in said housing for extracting moisture from room air,
    humidification means positioned in said housing for extracting moisture from room air,
    fan means positioned in said housing for circulating roon air through said housing so as to be either dehumidified by said dehumidification means or humidified by said humidification means,
    and tank means mountable in said housing in a manner for enabling said tank means to receive and accumulate water condensate from said dehumidification means during operation thereof, and for enabling said tank means to discharge water to said humidification means during operation thereof, said tank means including a container having a first opening at an upper end for receiving said condensate, a second opening at a lower and for discharging said water, plug means mountable so as to exchangably seal said openings, and valve means mountable to said second opening for controlling the discharge of water from said container.

4. A humidity control apparatus according to claim 3, wherein said humidification means comprises a water chamber positioned below said tank means, an intake duct means positioned for directing air from said fan means to a vapor chamber arranged above said water chamber, an ultrasonic oscillator mounted to said water chamber, and outlet duct means positioned for directing air fed to said vapor chamber by said inlet duct means to the exterior of said housing thereby dispensing water vapor therefrom.

5. A humidity control apparatus according to claim 4, wherein said valve means is constructed so as to supply water from said container for maintaining the water level in said water chamber constant during humidification operation.

6. A humidifier according to claim 5, comprising a drip pan located underneath said dehumidification means for collecting water condensed from the room air, and drainage means for directing water from said drip pan to said first opening.

* * * * *